US006528213B1

(12) United States Patent
Yoshihara et al.

(10) Patent No.: US 6,528,213 B1
(45) Date of Patent: Mar. 4, 2003

(54) STORAGE BATTERY

(75) Inventors: Yasuyuki Yoshihara, Aichi (JP); Kazuyoshi Yonezu, Aichi (JP); Go Kashio, Aichi (JP); Fumiaki Seta, Aichi (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/181,501

(22) Filed: Oct. 28, 1998

(30) Foreign Application Priority Data

Dec. 5, 1997 (JP) ............................................... 9-335358

(51) Int. Cl.[7] .............................. H01M 4/74; H01M 4/78
(52) U.S. Cl. .......................... 429/243; 429/233; 429/244
(58) Field of Search ........................... 429/233, 241–244, 429/204, 228

(56) References Cited

U.S. PATENT DOCUMENTS

| 1,155,046 A | * | 9/1915 | Crowdus |
| 1,323,720 A | * | 12/1919 | Pocock |
| 1,389,018 A | * | 8/1921 | Sundby |
| 3,310,437 A | * | 3/1967 | Daves et al. |
| 3,702,265 A | * | 11/1972 | Snyder et al. |
| 3,881,952 A | * | 5/1975 | Wheadon et al. |
| 4,151,331 A | * | 4/1979 | Hug et al. ..................... 429/94 |
| 4,303,747 A | * | 12/1981 | Bender ........................ 429/161 |

* cited by examiner

*Primary Examiner*—Patrick Ryan
*Assistant Examiner*—Tracy Dove
(74) *Attorney, Agent, or Firm*—RatnerPrestia

(57) ABSTRACT

An electrode includes an expanded grid and an active material provided on the grid, the thickness of the grid is the same as the strand and connecting sections of the strand, presenting a waveform as a whole. When this grid is used in the electrode as a current collector, the connecting sections are located near the center of the thickness direction of the electrode and strand are arranged by projecting upward and downward, respectively, from the boundary where the connecting sections are situated. Accordingly, a lead-acid storage battery having long life characteristics is made available.

17 Claims, 6 Drawing Sheets

Thickness of Connecting Section

US 6,528,213 B1

STORAGE BATTERY

FIELD OF THE INVENTION

The present invention relates to a grid used in a storage battery.

BACKGROUND OF THE INVENTION

Lead-acid storage batteries for electric vehicles and automobiles are required to have excellent high rate discharge characteristics. In producing a grid for a lead-acid storage battery, there are a casting method, which produces a grid by pouring molten lead into a mold, an expanding method, which produces a grid by the steps of applying slitting to a sheet of lead or lead alloy prepared in advance by a rolling method or the like and then expanding the slitted sheet, and some other methods. The casting method is not efficient since the operation is not continuous. In addition, depending on kinds of lead alloy, it may be difficult for the casting method to produce a thin grid that is required to improve high rate discharge characteristics, resulting in a drawback associated with this casting method.

The expanding method shows excellent productivity because of the continuous operation that is made possible with this method and also has a benefit of enabling the production of a thin electrode just by adjusting the thickness of belt-shaped material. Therefore, the expanding method has been recently used widely. A case where a grid is produced by the expanding method will be explained below. FIG. 6(a) is a plan view and a side view of a prior art grid and FIG. 6(b) is a partially enlarged view of the grid of FIG. 6(a). As shown in FIG. 6(a) and FIG. 6(b), the width of each respective connecting section 5 of strand 4 is about twice the incision width of strand 4 with the prior art grid. In other words, the connecting section 5 is larger than the grid rib 4 in thickness. As clearly seen in the side view of FIG. 6(a), a grid 20 shows a configuration, in which short straight-line segments are overlapping one another, and the overlaps come to coincide with the connecting sections 5. Further, the connecting sections 5 are slanting against the electrode surface, thereby causing the edges of the connecting sections 5 to project from the electrode surface.

In order to achieve enhanced durability with a lead-acid storage battery, it is desirable to apply pressure to an electrode group of the lead-acid storage battery. By applying pressure to the electrode group, an active material can be prevented from peeling and falling off the grid during a cycle lapse that is accompanied by expansion and contraction of the active material. Therefore, efforts have been made, on the other hand, to develop a material and a geometry for a battery container that can withstand the high pressure applied to the electrode group.

FIG. 7 is a cross-sectional view of an electrode, which uses such a prior art grid 20 as described in the above and provided with an active material. As indicated in FIG. 7, the elasticity of the connecting sections 5 of strand 4 of the grid is small when compared with the strand 4 of the grid, where an active material 6 is filled in. Therefore, as the pressure applied to the electrode group increases, a separator 7 is crushed at places where the separator 7 is in contact with pressure applied points 8 of the electrode, where the application of pressure is extensively strong, thereby blocking the supply of electrolyte to the foregoing pressure applied points 8 and/or creating an accumulation of gas at the pressure applied points 8. As a result, localized degradation of the active material 6 is caused to occur. Moreover, degradation of the crushed separator 7 multiplies and a short circuit at the pressure applied point 8 develops, thereby ending up with shortening of the battery's life.

SUMMARY OF THE INVENTION

A storage battery of the present invention comprises an electrode and an electrolyte material, in which the electrode has a grid and an active material is provided on the grid; and the grid has a plurality of strand and a plurality of connecting sections, where the strand cross one another; and in case where a pressure is applied to the foregoing grid in the thickness direction thereof, the grid is made to have such a configuration as to have the above pressure applied to each respective connecting section in the direction perpendicular to the afore-mentioned thickness direction of the grid.

What is particularly desirable is:

the plurality of strand as mentioned in the above have a first grid rib and a second grid rib that are arranged so as to have each of the afore-mentioned connecting sections located between the first grid rib and the second grid rib;

each of the foregoing first strand and second strand has a first projecting member and a second projecting member, respectively, with the above first projecting members and second projecting members projected opposite to one another, respectively, in the aforementioned thickness direction of the grid; and when a pressure is applied to the foregoing first projecting member in the direction vertical to the surface of the grid, the above pressure is applied to the connecting section in the direction perpendicular to the foregoing thickness direction of the grid.

Further, what is particularly desirable is:

the foregoing grid is an expanded grid;

each of the foregoing first strand is curved so as to have the foregoing projecting member located at the top of the curvature;

and each of the foregoing second strand is curved so as to have the foregoing projecting member located at the top of the curvature.

Accordingly, when an external pressure is applied to a grid in the thickness direction thereof, the pressure is propagated in the direction perpendicular to the thickness direction of the grid, thereby preventing the pressure from propagating in other directions than the direction perpendicular to the thickness direction of the grid. Therefore, when a pressure is applied to an electrode in a storage battery using an electrode group, which includes electrodes provided with an active material in grids and separators, connecting sections of the grid are prevented from applying the pressure to the separators via the active material, thereby enabling a uniform supply of an electrolyte material to electrodes. Furthermore, gas accumulation is also prevented from occurring. As a result, localized degradation of the active material is prevented and battery's life is extended.

By the use of a grid with strand curving upward and downward of the thickness direction, the curved ribs perform a function of springs and distribute the pressure applied to the grid in both the direction of pressure application and the vertical direction. Accordingly, the pressure applied to the active material and grid is made uniform, resulting in the prevention of localized degradation of the active material and separators and the extended battery's life.

KEY TO REFERENCE NUMERALS

1 Grid rib.
2 Connecting section of grid.
3 Pressure applied to electrode group.
3a Direction in which pressure is applied.
4 Prior art grid.
5 Connecting section of prior art grid.
6 Active material.
7 Separator.
8 Point where pressure is applied.
10 Grid.
12 Electrode.
14 Separator.
15 Electrode group.
20 Prior art grid.

DETAILED DESCRIPTION OF THE INVENTION

Figure 1:
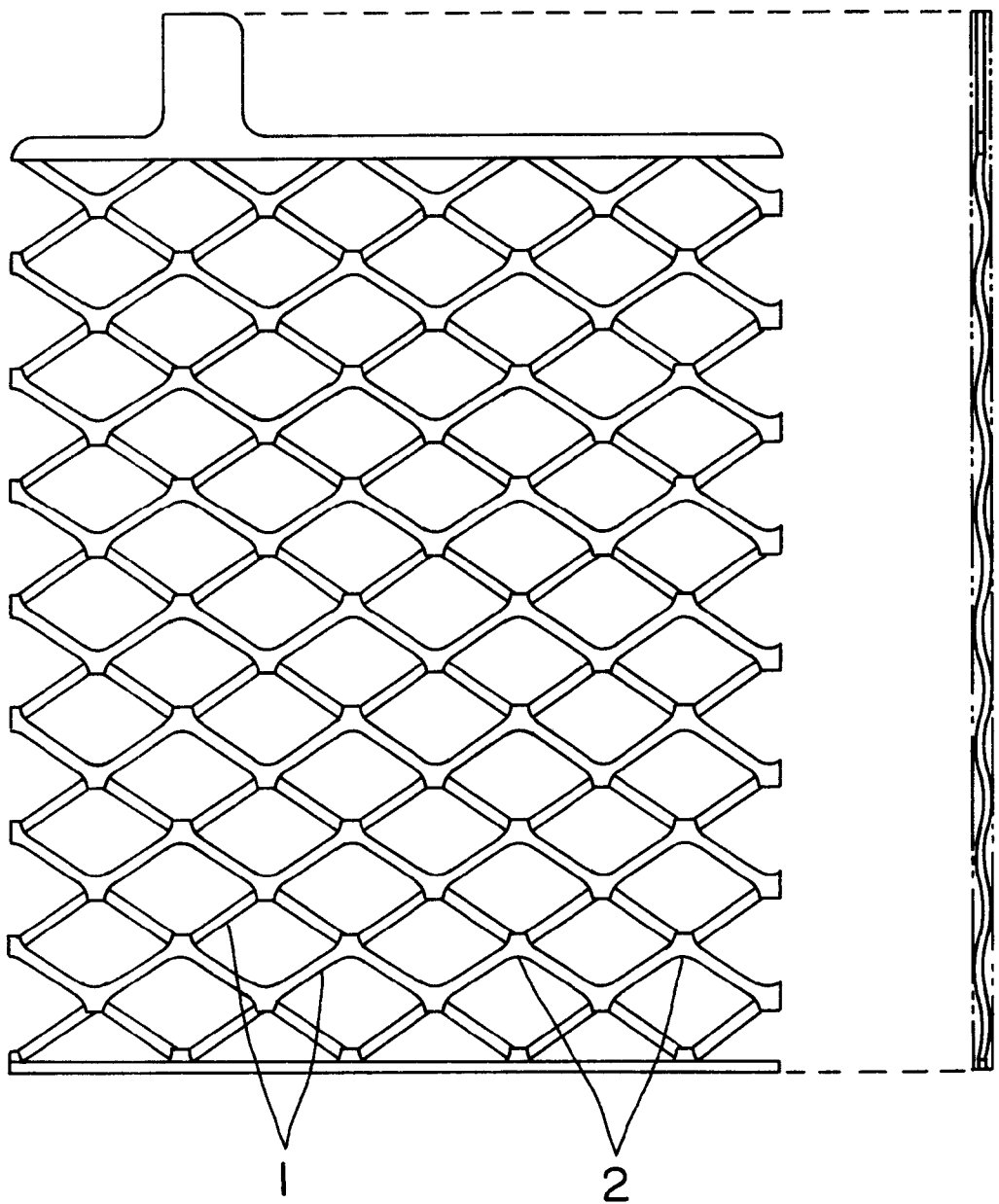
FIG. 1 shows a front view and a side view of a grid for a storage battery in an exemplary embodiment of the present invention.
Figure 2:
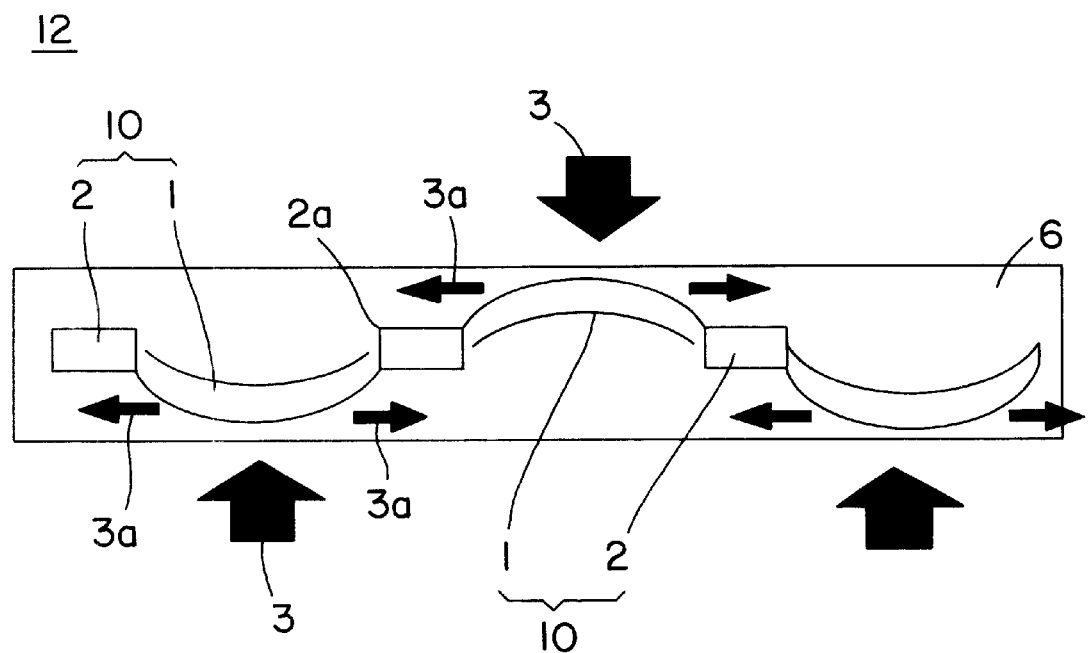
FIG. 2 is an enlarged cross-sectional view of an electrode prepared by the grid of FIG. 1.

Next, an explanation will be made on some of the exemplary embodiments of the present invention. FIG. 1 shows a grid used in a storage battery in an exemplary embodiment of the present invention. With a grid 10 as shown in FIG. 1, strand 1 and connecting sections 2 are desirably of the same thickness. As shown in the side view of the grid 10, the grid 10 that includes strand 1 and connecting sections 2 presents as a whole a wavy configuration. FIG. 2 is an enlarged cross-sectional view of an electrode prepared by the use of this grid 10.

In FIG. 2, an active material 6 is provided on the grid 10 that includes the strand 1 and connecting sections 2. The grid 10 serves as a current collector. In FIG. 2, the connecting sections 2 are located near the center of the thickness of an electrode 10 and the strand 1, each of which has a projecting member projected upward or downward from the boundary formed by the connecting sections 2 in the direction vertical to the electrode 12, are put in place.

Figure 5:
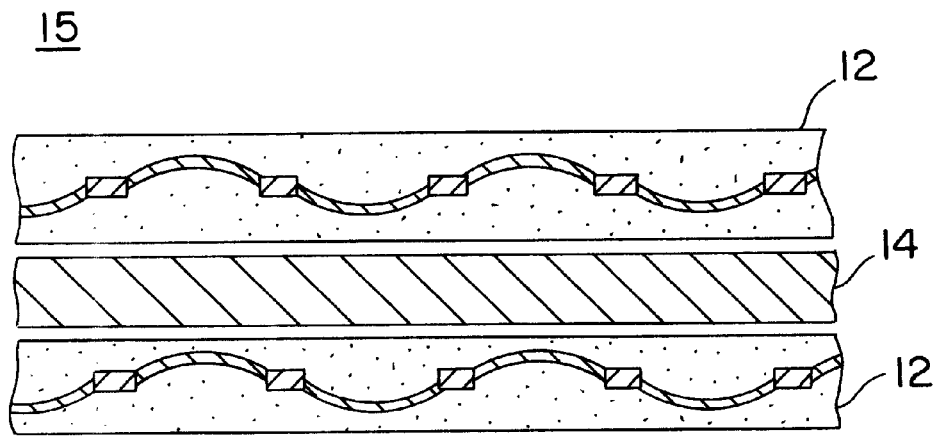
FIG. 5 is a partially exploded view of an electrode group provided with a grid, an active material and separators and built into a storage battery in an exemplary embodiment of the present invention.

Accordingly, when a pressure 3 applied to an electrode group is imposed in an direction as indicated in FIG. 2, the pressure 3 is first exerted on the grid rib 1 via the active material 6. However, since the grid rib 1 curves by projecting in the thickness direction of the electrode 12, the applied pressure is allowed to escape in the direction of an arrow 3a. FIG. 5 is a partially enlarged cross-sectional view of an electrode group 15 formed of the electrodes 12 thus prepared and separators 14. In FIG. 5, the electrodes 12 are situated opposite to one another with the separators 14 sandwiched in-between. Thus, edges 2a of the connecting sections 2 are not extruded from the electrode surface as was in the case of a prior art example. Furthermore, when the pressure 3 is applied in the thickness direction of the electrode 12, a strong pressure is hard to be exerted on the active material 6 located around the connecting sections 12 and further a strong pressure is also hard to be imposed on the separators 14 located opposite to the above electrodes 12. As a result, degradation of the active material is prevented and further a short circuit between the electrodes 12 is prevented.

A more specific exemplary embodiment will be explained in the following:

Exemplary Embodiment

Figure 6A:
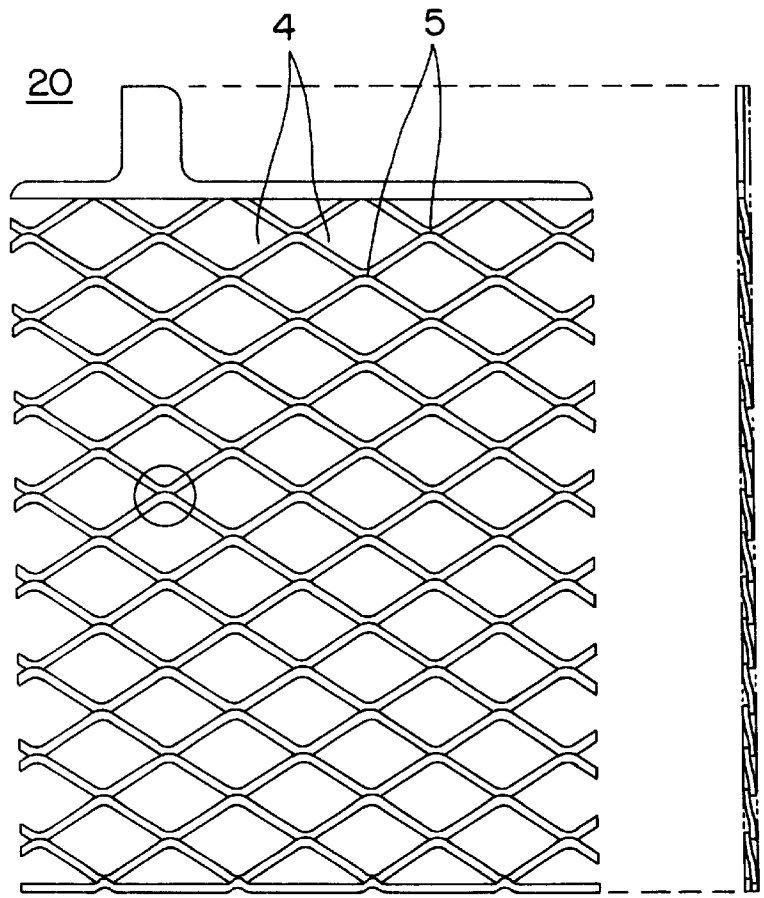
FIG. 6(a) shows a front view and a side view of a prior art grid.
Figure 6B:
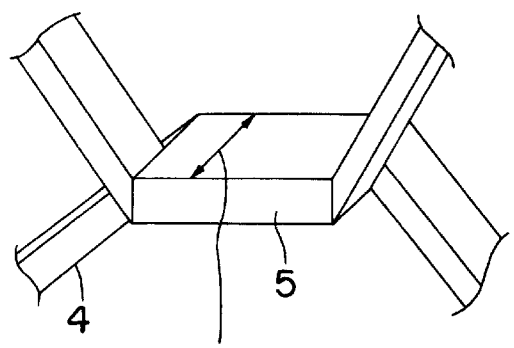
FIG. 6(b) is an enlarged view of a connecting section of a prior art grid.
Figure 7:
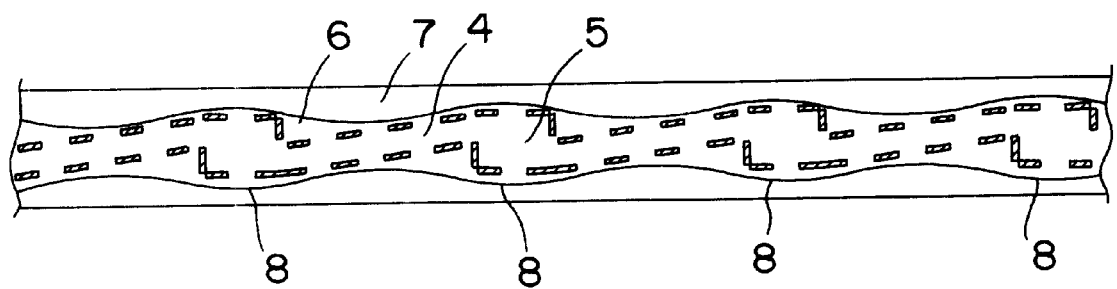
FIG. 7 is a cross-sectional view of an electrode prepared by the use of a prior art grid.

Powder mainly formed of lead oxide is kneaded with water and sulfuric acid to prepare a paste. The paste thus prepared is applied to a grid as shown in FIG. 1 and a prior art grid as shown in FIG. 6, respectively, and then dried. Thus, a variety of electrodes are produced. By the use of the electrodes thus produced and separators, electrode groups are constructed. These electrode groups are placed in a battery container and electrolyte is poured into the container, thus completing a variety of batteries. Batteries of 4 kinds, each of which shows a pressure imposed on electrode group differing from the others(the rates in magnitude of pressure imposed on electrode group are 1, 1.2, 1.4 and 1.6), have been prepared by inserting spacers in the container.

Table 1 shows conditions, whereby the foregoing 4 kinds of batteries have been prepared.

TABLE 1

| Pressure Imposed on Electrode Group | Battery Using Prior Art Grid | Battery Using Grid Structure of This Invention |
| --- | --- | --- |
| Normal (45 kg f/dm²) | A | AA |
| Normal × 1.2 | B | BB |
| Normal × 1.4 | C | CC |
| Normal × 1.6 | D | DD |

In Table 1, the conventional pressure imposed on electrode group amounting to about 45 kg f/dm² is referred to as "Normal".

Fifty batteries each with a pressure imposed on the electrode group as categorized in Table 1 have been prepared. Among the batteries using a prior art grid, the battery with the pressure imposed on electrode group equaling to 45 kg f/dm² is referred to as "A", the battery with the pressure equaling to 1.2 times the above pressure is referred to as "B", the battery with the pressure equaling to 1.4 times the above pressure is referred to as "C" and the battery with the pressure equaling to 1.6 times the above pressure is referred to as "D".

Among the batteries using a grid of the present invention, the battery with the pressure imposed on electrode group equaling to 45 kg f/dm² is referred to as "AA", the battery with the pressure equaling to 1.2 times the above pressure is referred to as "BB", the battery with the pressure equaling to 1.4 times the above pressure is referred to as "CC" and the battery with the pressure equaling to 1.6 times the above pressure is referred to as "DD".

After initial charging, these batteries are subjected to cycle life tests. In these cycle life tests, discharging at a constant current of 2.5 CA to reach 1.65 V/cell and then charging at a two-step constant current to 115% constitute one cycle. Here, the two-step constant current refers to a method of charging at a first step charge current (0.2 CA) to reach 2.4 V/cell and then charging at a second step charge current (0.05 CA) for 4 hours.

Figure 3:
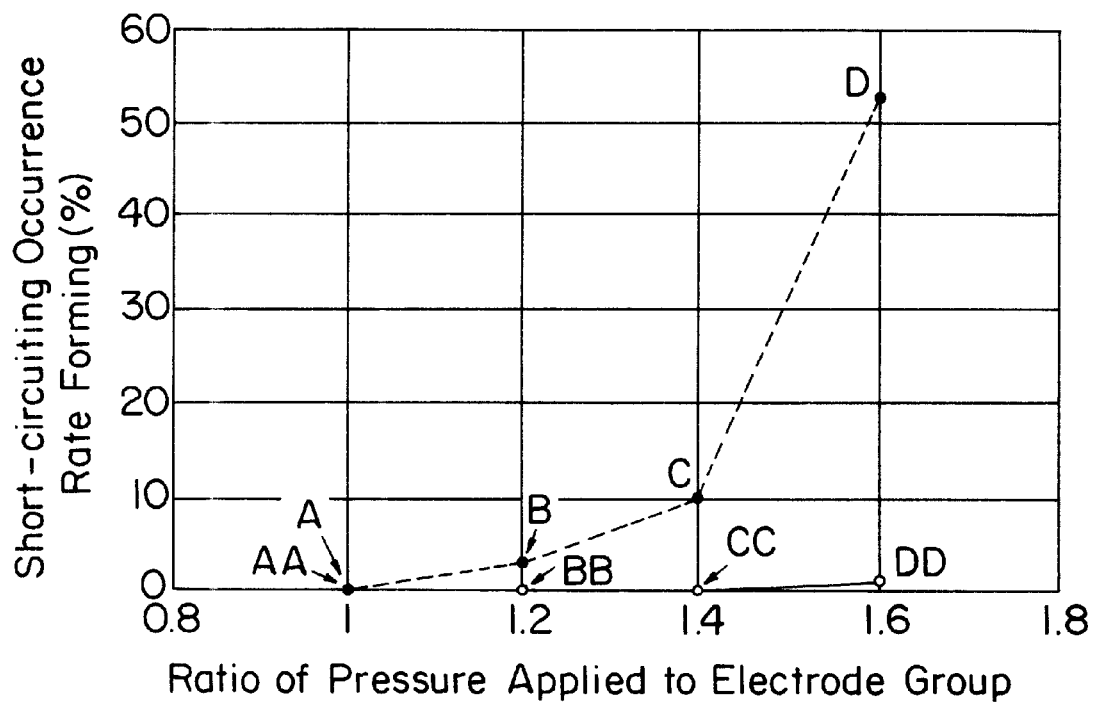
FIG. 3 is a graph to show the relationship between a pressure applied group and an occurrence of short circuit.

FIG. 3 shows the relationship between the pressure imposed on the electrode group and the rate of developing a short circuit. In FIG. 3, it is learned that, with a battery using a prior art grid, the rate of developing a short circuit increases as the pressure imposed on the electrode group becomes higher. Out of the storage batteries using the prior art grid and applying a pressure imposed on electrode group of 1.6 times the normal pressure, as many as about 50% of the storage batteries tested have ended up with developing a short circuit.

In contrast to the above, with a battery using a grid of the present invention, the rate of developing a short circuit has decreased extensively even with the battery of a raised pressure imposed on electrode group. Only 1% of the batteries with a rate of the pressure imposed on the electrode group equaling to 1.6 have developed a short circuit. Thus, any categories of the batteries of the present invention have shown a small rate in developing a short circuit.

Figure 4:
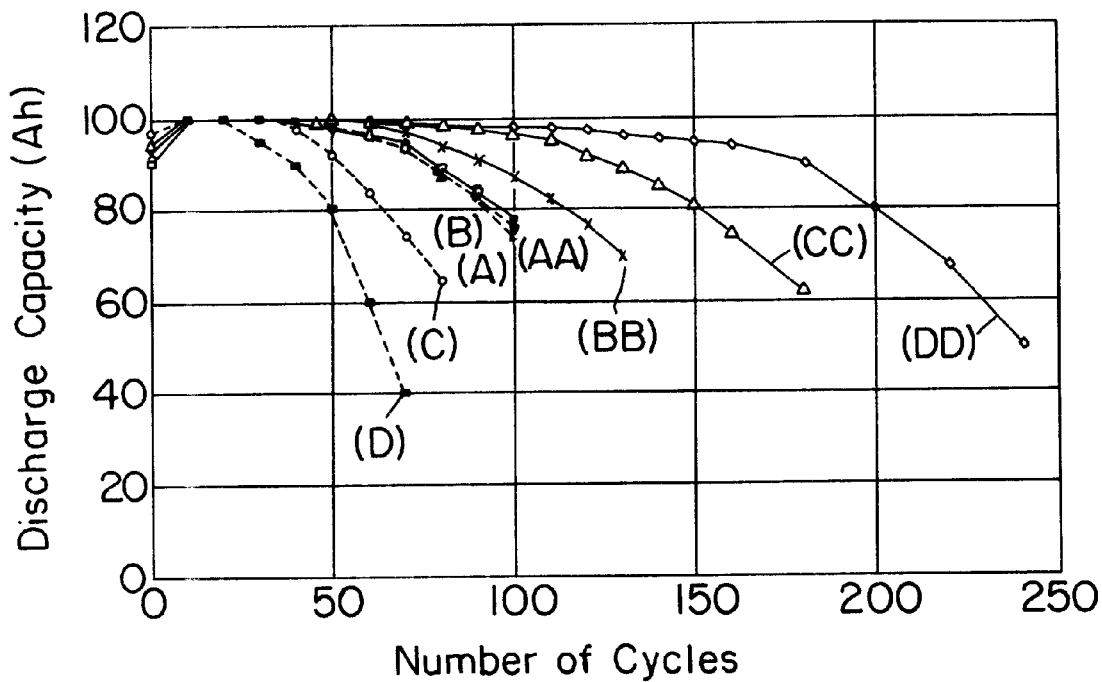
FIG. 4 is a graph to show the relationship between discharge capacity and cycle characteristics.

Results of the cycle life tests are shown in FIG. 4.

All the categories of the batteries using a grid of the present invention (AA, BB, CC and DD) have shown a smaller reduction in discharge capacity vs. cycle number than the storage batteries using a prior art grid (A, B, C and D). In particular, the batteries with a higher pressure imposed on an electrode group show longer cycle life.

Among the batteries using a prior art grid, the battery (A) and battery (B) have relatively long life and batteries with a larger pressure imposed on electrode group than the above have shown shorter life due to short-circuiting caused by degradation of separators. Further, an accumulation of sulfuric acid after cycle tests has been investigated by chemical analyses. As a result, it is found out that the batteries (B), (C) and (D) have accumulated more lead sulfate in the active material near the connecting sections of strand in comparison with the battery (A). This seems to be attributed to the fact that gas accumulations are created at the time of charging and/or insufficient supply of electrolyte.

Therefore, the life of the batteries (B), (C) and (D) is considered to have turned out short when compared with the battery (A). According to the present exemplary embodiment, the battery (DD) has shown the longest life and any short circuits and nonuniform accumulations of lead sulfate have not been observed. Thus, a battery with a structure disclosed by the present invention shows excellent life characteristics even with a high pressure imposed on electrode group.

It is obvious from the explanation made in the above that short circuits and nonuniform accumulations of lead sulfate are prevented with a storage battery of the present invention even when a pressure imposed on electrodes is made high with the resulting realization of a storage battery of remarkably enhanced life characteristics. Benefits to the industry gained by such a storage battery are extremely great.

What is claimed is:

1. A storage battery comprising:

an electrode and an electrolyte material, wherein said electrode includes a grid and an active material provided on said grid, said grid includes a plurality of strands and a plurality of connecting sections where each respective strand of said plurality of strands connects with at least one other strand, ones of said strands extending along opposite semicircular paths relative to others of said strands in a thickness direction of said electrode.

2. The storage battery according to claim 1, wherein said plurality of strands include a first grid rib and a second grid rib located opposite to each other with said connecting section placed therebetween, and wherein when a pressure is applied in said thickness direction of said electrode, said pressure propagates to said connecting sections in a direction perpendicular to said thickness direction of said electrode grid said first grid rib has a first projecting member and said second grid has a second projecting member, respectively, with said first projecting member and second projecting member alternately projected opposite to each other in said thickness direction such that said pressure, which is applied to said first projecting member in said thickness direction, is applied to said connecting sections in the direction perpendicular to said thickness direction of said grid.

3. The storage battery according to claim 2, wherein said grid is an expanded grid, said first grid rib is curved with said first projecting member located at the top of the curvature, and said second grid rib is curved with said second projecting member located at the top of the curvature.

4. The storage battery according to claim 3, wherein the thickness of said connecting sections is the same as the thickness of said strand.

5. The storage battery according to claim 3, wherein the thickness of said connecting sections is smaller than a maximum thickness of said grid.

6. The storage battery according to claim 1, wherein the surface of said grid has a generally undulating shape.

7. The storage battery according to claim 1, wherein said grid is formed of at least one material selected from lead and lead alloys.

8. The storage battery according to claim 1, wherein said active material is lead oxide and said electrolyte material is sulfuric acid.

9. A storage battery comprising:

an electrode and an electrolyte material, wherein said electrode includes a plurality of expanded grids provided with a current collecting function and an active material surrounding each expanded grid, said each grid includes a plurality of grid ribs and a plurality of connecting sections where each respective grid rib of said plurality of grid ribs connects with at least one other grid rib, said plurality of grid ribs including first grid ribs and second grid ribs, said first grid ribs being curved and extending in semicircular paths in a first projecting direction as they extend between connecting sections, and said second grid ribs being curved and extending in semicircular paths in a second projecting direction opposite to the first projecting direction, as they extend between connecting sections, said first and second projecting directions being in a thickness direction of said electrode.

10. The storage battery according to claim 9, wherein said first grid rib is curved with said first projecting member located at the top of the curvature, and said second grid rib is curved with said second projecting member located at the top of the curvature, when a pressure is applied in the thickness direction of said each projecting member, said pressure is applied to said each connecting section in a direction perpendicular to said thickness direction of said grid.

11. The storage battery according to claim 9, wherein said electrode is exerted with a pressure of 45 kg-fdm$^2$.

12. The storage battery according to claim 9, further comprising at least one spacer,
   wherein said at least one spacer exerting said pressure on said electrode.

13. The storage battery according to claim 9, wherein said electrode is exerted with a pressure of 54 kg-f/dm$^2$.

14. The storage battery according to claim 9, wherein said electrode is exerted with a pressure of 63 kg-f/dm$^2$.

15. The storage battery according to claim 1, further comprising at least one spacer,
   wherein said at least one spacer exerting said pressure on said electrode.

16. The storage battery according to claim 1, wherein said electrode is exerted with a pressure of 54 kg-f/dm$^2$.

17. The storage battery according to claim 1, wherein said electrode is exerted with a pressure of 63 kg-f/dm2.

* * * * *